United States Patent [19]
Rothschild et al.

[11] Patent Number: 6,097,376
[45] Date of Patent: Aug. 1, 2000

[54] LIGHT PEN SYSTEM FOR USE WITH A CRT SCANNING DISPLAY

[76] Inventors: Omri Rothschild, 32 Avner Street, Tel Aviv 69937; Roni Raviv, 13 Simtat Dalia, Nes Ziona 74061, both of Israel

[21] Appl. No.: 09/075,320

[22] Filed: May 11, 1998

[51] Int. Cl.[7] ....................................................... G09G 1/00
[52] U.S. Cl. ............................................................ 345/180
[58] Field of Search ..................................... 345/180, 181

[56] References Cited

U.S. PATENT DOCUMENTS

| | | |
|---|---|---|
| 3,505,561 | 4/1970 | Ward et al. . |
| 3,506,875 | 4/1970 | Watanabe et al. . |
| 3,543,240 | 11/1970 | Miller et al. . |
| 3,551,896 | 12/1970 | Baskin et al. . |
| 3,594,608 | 7/1971 | Mutton . |
| 3,651,509 | 3/1972 | Ngo . |
| 3,659,281 | 4/1972 | Mori . |
| 3,758,717 | 9/1973 | Granzotti . |
| 3,944,988 | 3/1976 | Mayer . |
| 3,997,891 | 12/1976 | Iwamura et al. . |
| 4,017,680 | 4/1977 | Anderson et al. . |
| 4,053,765 | 10/1977 | Kuffer . |
| 4,109,146 | 8/1978 | Hillman . |
| 4,129,858 | 12/1978 | Hara . |
| 4,146,880 | 3/1979 | Arizabalaga . |
| 4,190,831 | 2/1980 | Stahle et al. . |
| 4,263,592 | 4/1981 | Takahashi et al. . |
| 4,277,783 | 7/1981 | Sampieri et al. . |
| 4,367,465 | 1/1983 | Mati et al. . |
| 4,377,810 | 3/1983 | Wolff . |
| 4,454,417 | 6/1984 | May . |
| 4,565,947 | 1/1986 | Minn . |
| 4,591,841 | 5/1986 | Gunderson et al. . |
| 4,602,907 | 7/1986 | Foster . |
| 4,620,107 | 10/1986 | Frame . |
| 4,642,459 | 2/1987 | Caswell et al. . |
| 4,675,665 | 6/1987 | Halliwell . |
| 4,677,428 | 6/1987 | Bartholow . |
| 4,697,175 | 9/1987 | MacDonald . |
| 4,789,836 | 12/1988 | May . |
| 4,802,722 | 2/1989 | Persson . |
| 4,812,828 | 3/1989 | Nishi et al. . |
| 4,923,401 | 5/1990 | Marshall et al. . |
| 5,134,389 | 7/1992 | Furuta et al. . |
| 5,138,304 | 8/1992 | Bronson . |
| 5,151,688 | 9/1992 | Tanaka et al. . |
| 5,179,368 | 1/1993 | Lippincott . |
| 5,187,467 | 2/1993 | Myers . |
| 5,600,348 | 2/1997 | Bartholow et al. . |
| 5,646,650 | 7/1997 | Miller et al. . |
| 5,691,749 | 11/1997 | Sugiyama . |
| 5,717,435 | 2/1998 | Fukushima et al. ............... 345/180 |
| 5,877,752 | 3/1999 | Puthuff et al. . |
| 5,953,001 | 9/1999 | Challener et al. ................ 345/179 |
| 5,959,616 | 9/1999 | Challener ........................ 345/179 |

*Primary Examiner*—Richard A. Hjerpe
*Assistant Examiner*—Ronald Laneau
*Attorney, Agent, or Firm*—Pillsbury Madison & Sutro LLP

[57] ABSTRACT

A light pen system for use with a CRT scanning display pen system comprising:

a hand-held light receiving assembly which is adapted to be pointed at a desired location on a CRT scanning display and to provide a light detection output indication indicating precisely an instant when light detection occurs and a horizontal line position signal synthesizer receiving at least one scan line address from the computer and being operative to generate horizontal line position information, based on the at least one scan line address, corresponding to the instant when light detection occurs. A light pen method is also provided.

28 Claims, 8 Drawing Sheets

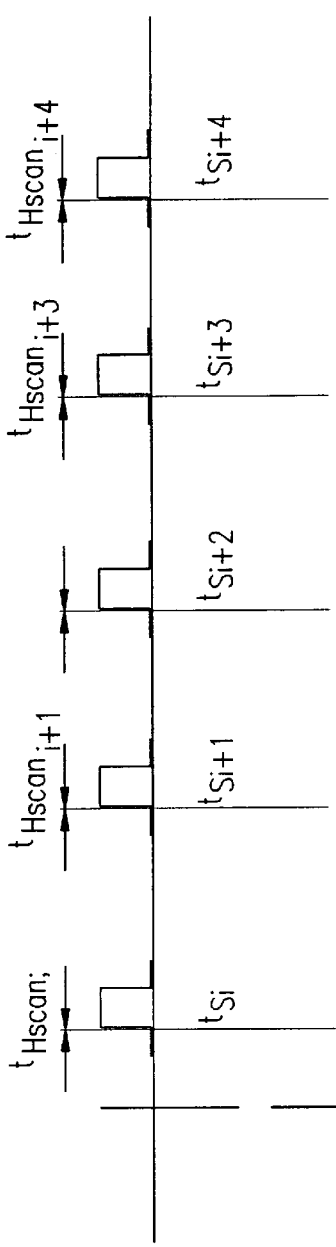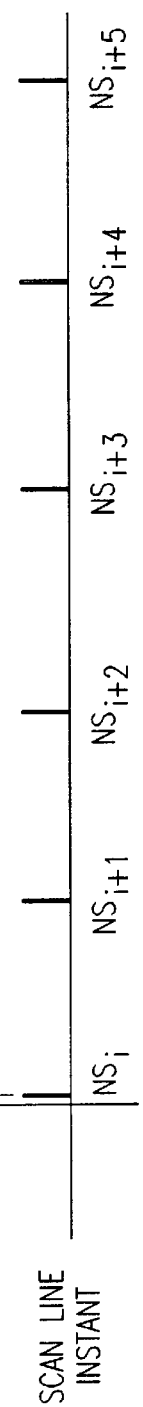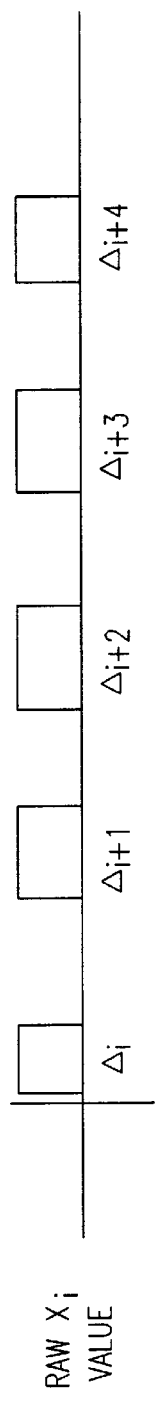

LIGHT PEN SYSTEM FOR USE WITH A CRT SCANNING DISPLAY

FIELD OF THE INVENTION

The present invention relates to interactive computer systems generally and more particularly to computer input devices which interact with a computer display.

BACKGROUND OF THE INVENTION

A great variety of interactive computer systems and computer input devices useful therewith are known in the art. Various types of light pens are described in the following U.S. Pat. Nos., which are believed to represent the current state of the art: 5,691,749; 5,600,348; 5,187,467; 5,179,368; 5,151,688; 5,138,304; 5,134,389; 4,923,401; 4,812,828; 4,802,722; 4,789,836; 4,697,175; 4,677,428; 4,675,665; 4,642,459; 4,620,107; 4,602,907; 4,565,947; 4,454,417; 4,377,810; 4,367,465; 4,277,783; 4,263,592; 4,190,831; 4,146,880; 4,129,858; 4,109,146; 4,053,765; 4,017,680; 3,997,891; 3,944,988; 3,758,717; 3,659,281; 3,651,509; 3,594,608; 3,551,896; 3,543,240; 3,506,875; 3,505,561.

SUMMARY OF THE INVENTION

The present invention seeks to provide an ergonomic computer input device which is significantly simpler and less expensive than prior art devices.

There is thus provided in accordance with a preferred embodiment of the present invention a light pen system for use with a CRT scanning display and a computer, the light pen system comprising:

a hand-held light receiving assembly which is adapted to be pointed at a desired location on a CRT scanning display and to provide a light detection output indication indicating precisely an instant when light detection occurs; and a horizontal line position signal synthesizer receiving at least one scan line address from the computer and being operative to generate horizontal line position information, based on the at least one scan line address, corresponding to the instant when light detection occurs.

There is also provided in accordance with a preferred embodiment of the present invention a light pen system for use with a CRT scanning display, the light pen system comprising:

a hand-held light receiving assembly which is adapted to be pointed at a desired location on a CRT scanning display and to provide a light detection output indication indicating precisely an instant when light detection occurs; and a horizontal line position signal synthesizer receiving at least one scan line address and being operative to generate horizontal line position information, based on the at least one scan line address, corresponding to the instant when light detection occurs.

Preferably, the horizontal line position signal synthesizer receives multiple scan line addresses asynchronously from the computer and provides an estimated horizontal line position signal output based thereon.

In accordance with a preferred embodiment of the present invention, the horizontal line position signal synthesizer receives the at least one scan line address from the computer in the absence of horizontal and vertical sync signals and is operative to generate horizontal line position information, based on the at least one scan line address, corresponding to the instant when light detection occurs, without employing horizontal and vertical sync signals.

There is also provided in accordance with a preferred embodiment of the present invention a computer light pen system comprising:

a computer;

a CRT scanning display;

a hand-held light receiving assembly which is adapted to be pointed at a desired location on a CRT scanning display and to provide a light detection output indication indicating when light detection occurs; and a horizontal line position signal synthesizer receiving at least one scan line address and being operative to generate horizontal line position information, based on the at least one scan line address, corresponding to when light detection occurs.

There is additionally provided in accordance with a preferred embodiment of the present invention a computer light pen system comprising:

a computer;

a CRT scanning display;

a hand-held light receiving assembly which is adapted to be pointed at a desired location on a CRT scanning display and to provide a light detection output indication indicating when light detection occurs; and wherein the computer comprises:

a horizontal line position signal synthesizer receiving at least one scan line address and being operative to generate horizontal line position information, based on the at least one scan line address, corresponding to when light detection occurs.

Preferably, the estimated horizontal line position output is provided by averaging a plurality of horizontal line position output indications derived from a plurality of the multiple scan line addresses.

In accordance with a preferred embodiment of the present invention, the light pen system also comprising:

a vertical line position signal synthesizer receiving at least one scan line address from the computer and being operative to generate vertical line position information, based on the at least one scan line address, corresponding to the instant when light detection occurs.

There is further provided in accordance with a preferred embodiment of the present invention a light pen system for use with a CRT scanning display and a computer, the light pen system comprising:

a hand-held light receiving assembly which is adapted to be pointed at a desired location on a CRT scanning display and to provide a light detection output indication indicating precisely an instant when light detection occurs; and a vertical line position signal synthesizer receiving at least one scan line address from the computer and being operative to generate vertical line position information, based on the at least one scan line address, corresponding to the instant when light detection occurs.

There is additionally provided in accordance with a preferred embodiment of the present invention a light pen system for use with a CRT scanning display, the light pen system comprising:

a hand-held light receiving assembly which is adapted to be pointed at a desired location on a CRT scanning display and to provide a light detection output indication indicating precisely an instant when light detection occurs; and a vertical line position signal synthesizer receiving at least one scan line address and being operative to generate vertical line position information, based on the at least one scan line address, corresponding to the instant when light detection occurs.

Preferably, the horizontal line position signal synthesizer is located within a hand-held housing that also encloses the hand-held light receiving assembly.

There is additionally provided in accordance with a preferred embodiment of the present invention a light pen method for use with a CRT scanning display and a computer, the light pen method comprising:

pointing a hand-held light receiving assembly at a desired location on a CRT scanning display and providing a light detection output indication indicating precisely an instant when light detection occurs; and operating a horizontal line position signal synthesizer receiving at least one scan line address from the computer to generate horizontal line position information, based on the at least one scan line address, corresponding to the instant when light detection occurs.

There is additionally provided in accordance with a preferred embodiment of the present invention a light pen method for use with a CRT scanning display, the light pen method comprising:

pointing a hand-held light receiving assembly at a desired location on a CRT scanning display and providing a light detection output indication indicating precisely an instant when light detection occurs; and employing a horizontal line position signal synthesizer receiving at least one scan line address to generate horizontal line position information, based on the at least one scan line address, corresponding to the instant when light detection occurs.

Preferably, the horizontal line position signal synthesizer receives multiple scan line addresses asynchronously from the computer and provides an estimated horizontal line position signal output based thereon.

In accordance with a preferred embodiment of the present invention the horizontal line position signal synthesizer receives the at least one scan line address from the computer in the absence of horizontal and vertical sync signals and is operative to generate horizontal line position information, based on the at least one scan line address, corresponding to the instant when light detection occurs, without employing horizontal and vertical sync signals.

Preferably, the horizontal line position signal synthesizer employs hardware forming part of a computer.

In accordance with a preferred embodiment of the present invention the light pen method also comprises the step of operating a vertical line position signal synthesizer receiving at least one scan line address from the computer to generate vertical line position information, based on the at least one scan line address, corresponding to the instant when light detection occurs.

BRIEF DESCRIPTION OF THE DRAWINGS

The present invention will be more fully understood and appreciated from the following detailed description, taken in conjunction with the drawings in which:

FIGS. 6A, 6B, 6C, 6D and 6E are timing diagrams illustrating the operation of the interactive computer system of FIG. 5;

DETAILED DESCRIPTION OF A PREFERRED EMBODIMENT

Figure 1:
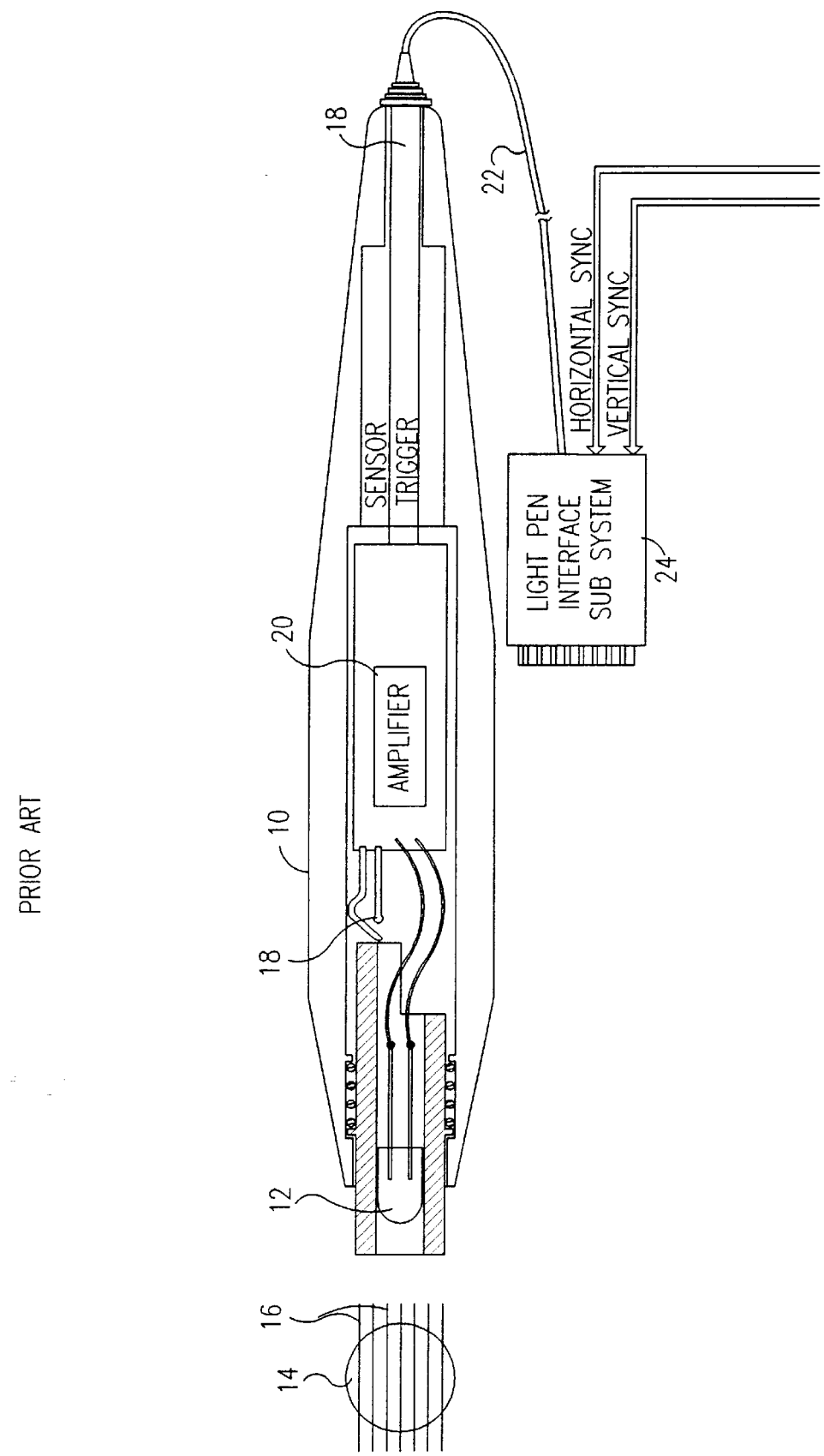
FIG. 1 is a simplified illustration of a typical prior art light pen assembly.

Reference is now made to FIG. 1, which is a simplified illustration of a typical prior art light pen assembly. The prior art light pen assembly of FIG. 1 comprises a hand-held housing 10 in which is disposed a light sensor 12, such as a photodiode or phototransistor, which views an area 14 on a CRT screen and typically sees a plurality of scan lines 16 cross that area. Mounted in housing 10 is a trigger switch 18, such as a pressure-sensitive switch which senses when the pen is pressed against a CRT screen.

The output of sensor 12 is supplied to an amplifier 20 which provides an amplified output signal. The amplified output signal is supplied together with a trigger output signal from trigger switch 18 via a cable 22 to a light pen interface sub-system 24, which is typically embodied as a special purpose interface card plugged into an expansion slot of a conventional computer (not shown). Light pen interface subsystem 24 receives horizontal and vertical sync signals which are tapped from the video connection between the computer and the CRT display (both not shown).

Figure 2:
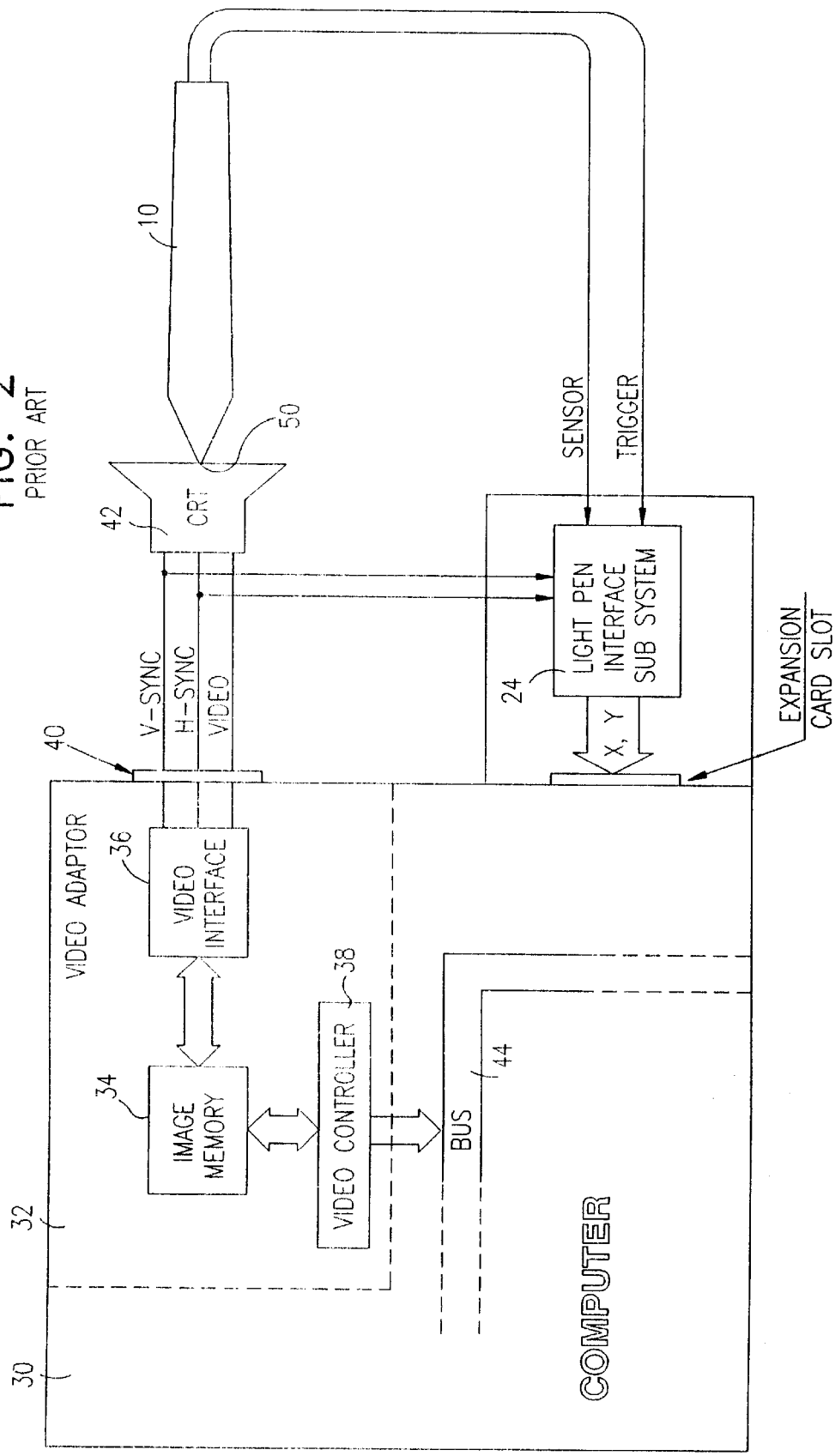
FIG. 2 is a simplified illustration of a prior art interactive computer system employing a typical prior art light pen.

Reference is now made to FIG. 2, which is a simplified illustration of a prior art interactive computer system employing a typical prior art light pen. In the typical prior art system shown in FIG. 2, a typical computer 30 includes a video adaptor 32 which contains an image memory 34 coupled to a video interface 36 and to a video controller 38. The video interface 36 is coupled via a video connector 40 to a CRT display 42 and provides thereto a video signal as well as vertical and horizontal sync signals. The video controller 38 interfaces with a main bus 44 of the computer 30.

The light pen interface sub-system 24 (FIG. 1) is seen mounted in an expansion card slot of computer 30. As noted above, light pen interface subsystem 24 receives horizontal and vertical sync signals which are tapped from the video connection between the computer 30 and the CRT display 42 as well as amplified sensor and trigger outputs from the light pen.

Figure 3:
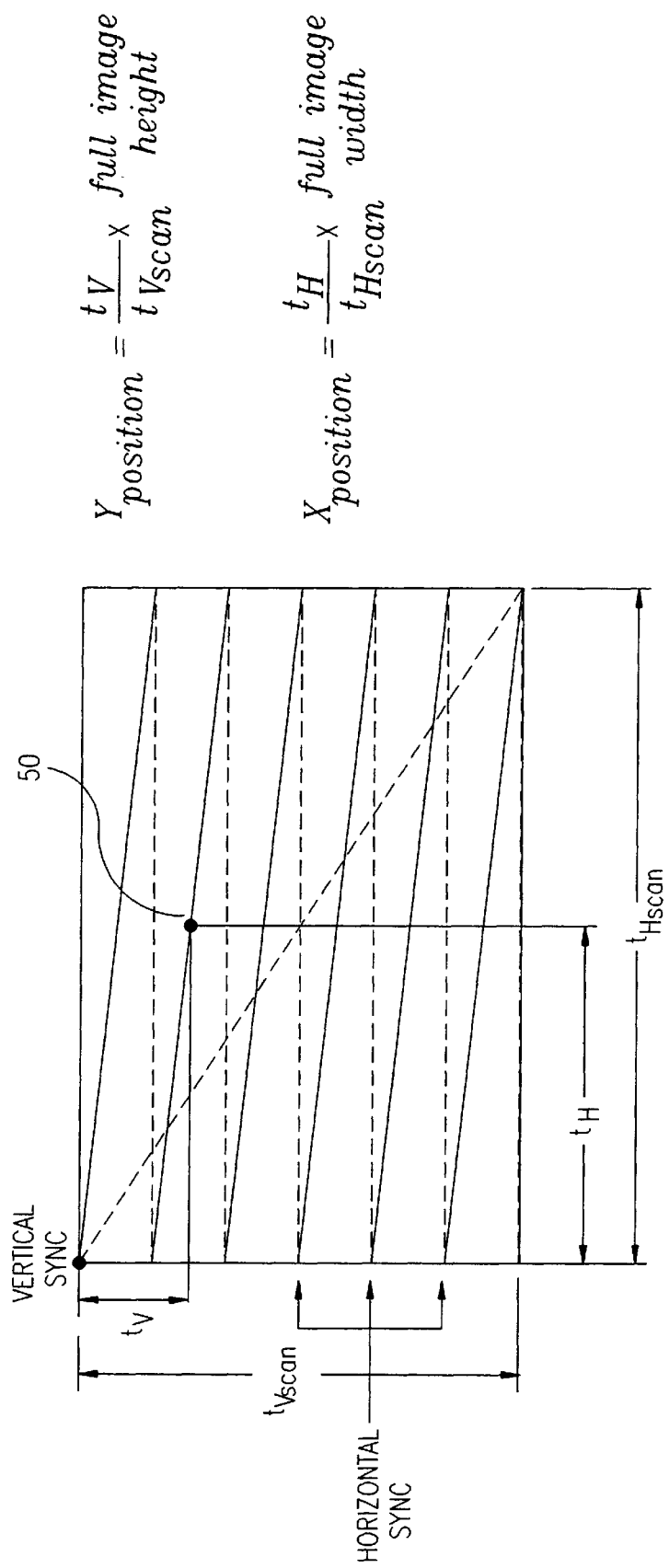
FIG. 3 is a simplified illustration of prior art location determination using a typical prior art light pen such as that shown in FIG. 1 and the system of FIG. 2.

Reference is now made to FIG. 3, which is a simplified illustration of prior art location determination using the typical prior art light pen assembly of FIG. 1 and the typical prior art system of FIG. 2. It can be seen that the position of a point, indicated by reference numeral 50 on the CRT display 42 (FIG. 2) is calculated by using the vertical and horizontal sync signals.

The total vertical scan duration $t_{vscan}$ is determined by measuring the time difference between sequential vertical sync signals. The total horizontal scan duration $t_{hscan}$ is determined by measuring the time difference between sequential horizontal sync signals.

The vertical position is determined by the ratio of the time duration $t_V$ from the vertical sync signal to the instant of detection of light at point 50 by the light pen to the vertical scan duration, multiplied by the full image height.

The horizontal position is determined by the ratio of the time duration $t_H$ from the horizontal sync signal to the instant of detection of light at point 50 by the light pen to the horizontal scan duration, multiplied by the full image width.

Once the horizontal and vertical positions of point 50 have been determined by light pen interface sub system 24, they are communicated directly to the computer via the expansion card slot connectors in computer 30.

Figure 4:
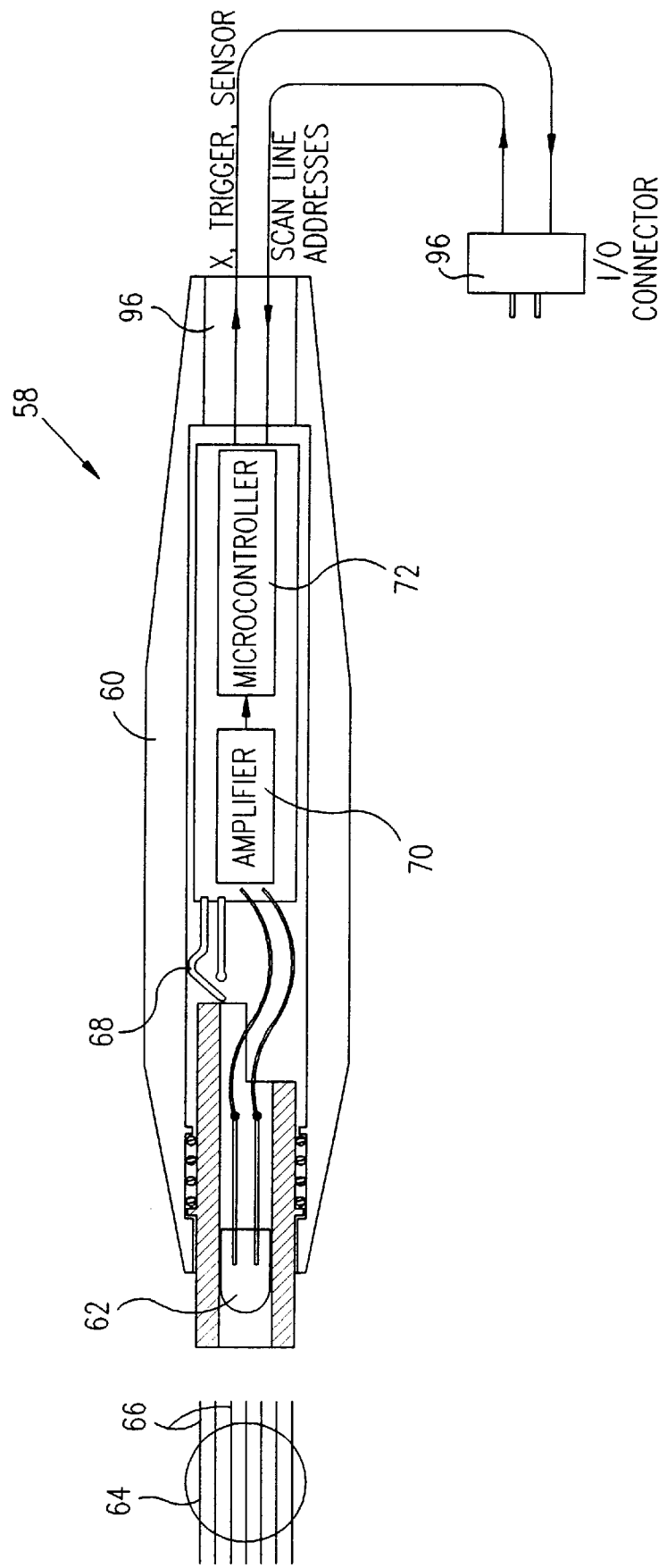
FIG. 4 is a simplified illustration of a light pen assembly constructed and operative in accordance with a preferred embodiment of the present invention.

Reference is now made to FIG. 4, which is a simplified illustration of a light pen assembly 58 constructed and operative in accordance with a preferred embodiment of the present invention. The light pen assembly of FIG. 4 comprises a hand-held housing 60 in which is disposed a light sensor 62, such as a photodiode or phototransistor, which views an area 64 on a CRT screen and typically sees a plurality of scan lines 66 cross that area.

Mounted in housing 60 there is preferably provided a trigger switch 68, such as a pressure-sensitive switch which senses when the pen is pressed against a CRT screen. The output of sensor 62 is supplied to an amplifier 70 which provides an amplified output signal.

In accordance with a preferred embodiment of the present invention, the amplified output signal is supplied to a microcontroller 72 which calculates the horizontal position of a point on the CRT display screen which is viewed by sensor 62. In accordance with a preferred embodiment of the present invention, the microcontroller 72 is located physically within housing 60 of the light pen. Alternatively, it may be located exteriorly of the housing 60 or even inside a computer which drives the CRT display. As a further alternative, the functionality of the micro-controller 72 may be carried out by the computer.

It is a particular feature of the present invention that the microcontroller 72 is operative to determine the position of a point viewed by the light pen without employing the horizontal and vertical sync signals customarily used in the prior art. In clear distinction to the prior art, the present invention employs a scan line address received from the computer in order to determine this position.

It is appreciated that the scan line address is a less precise indication than the horizontal and vertical sync signals and thus it is not an obvious choice as an information source of position determination. The present inventors have determined however, that use of the scan line address, notwithstanding its deficiencies, enables light pen system to be provided in a significantly simpler manner and at substantially lower cost than that enabled by the prior art.

The present invention thus provides a light pen assembly which can be conveniently and inexpensively connected to a standard I/O port on a conventional computer and which obviates the need for tapping the horizontal and vertical synch signal outputs to the display and also obviates the need for installation of a dedicated light pen interface card into an expansion slot of the computer. Thus the light pen of the present invention can be readied for use by most users without requiring dismantling of their computer or professional installation.

Figure 5:
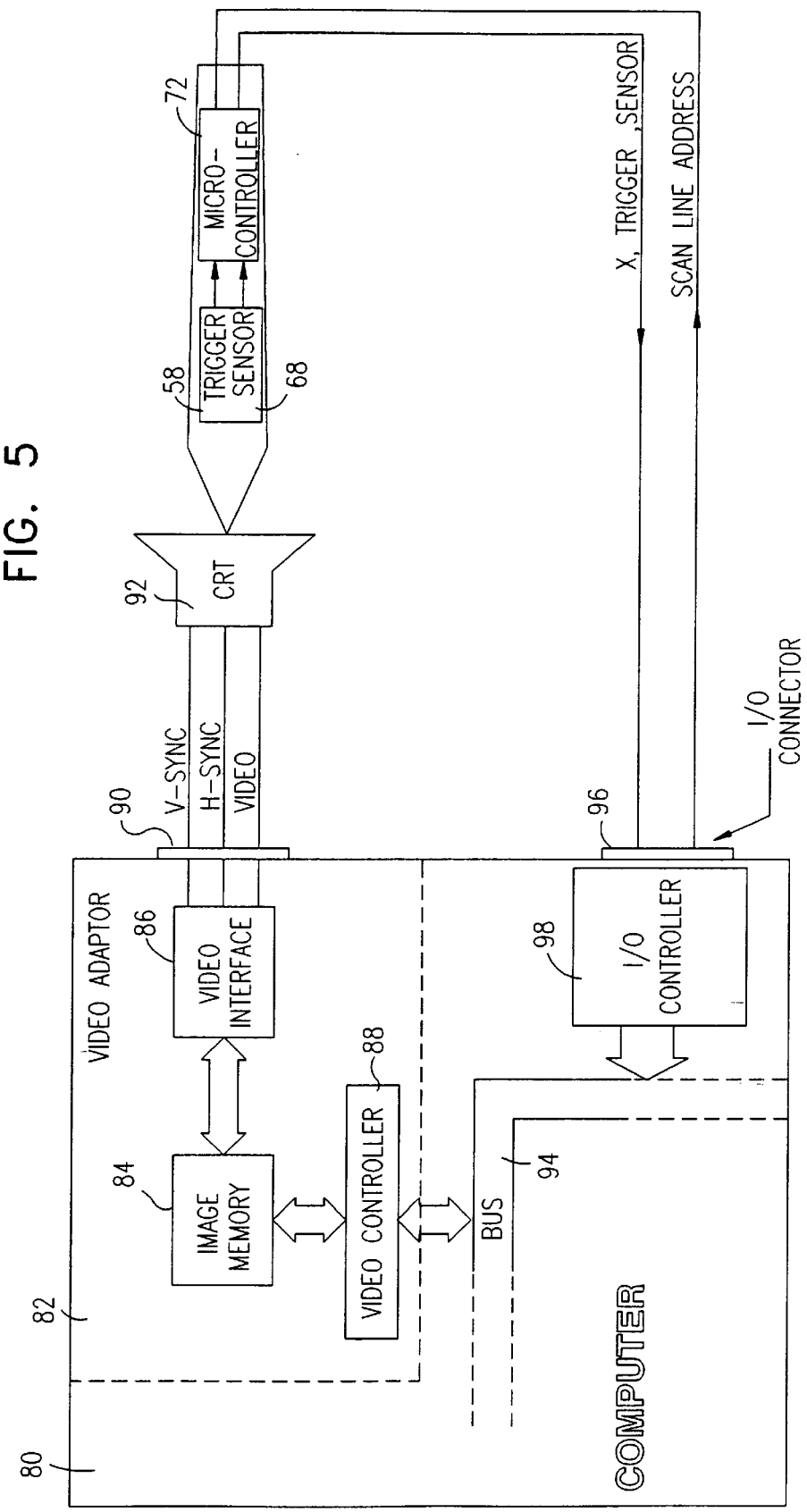
FIG. 5 is a simplified illustration of an interactive computer system constructed and operative in accordance with the present invention and employing the light pen assembly of the present invention.

Reference is now made additionally to FIG. 5, which is a simplified illustration of an interactive computer system constructed and operative in accordance with the present invention and employing the light pen assembly of the present invention. In the system shown in FIG. 5, a typical computer 80 includes a video adaptor 82 which contains an image memory 84 coupled to a video interface 86 and to a video controller 88. The video interface 86 is coupled via a video connector 90 to a CRT display 92 and provides a video signal as well as vertical and horizontal sync signals. The video controller 88 interfaces with a main bus 94 of the computer 80.

In contrast to the prior art no light pen interface subsystem is mounted in an expansion card slot of computer 80. As noted above, there is no light pen interface subsystem which receives horizontal and vertical sync signals which are tapped from the connection between the computer 80 and the CRT display 92.

Instead, the microcontroller 72 (FIG. 4) provides a calculated X (horizontal) position output indication via an I/O connector 96, such as a universal serial bus connector, an I/O interface of computer 80 and a conventional I/O controller 98 of computer 80 to main bus 94. The Y (vertical) position is given by the current scan line address at the instant of detection by the sensor.

Reference is now made to FIGS. 6A, 6B, 6C, 6D and 6E, which are timing diagrams illustrating the operation of the interactive computer system of FIG. 5. FIG. 6A illustrates the timing of the entry of the CRT beam into the field of view of the sensor 62 (FIG. 4) and illustrates pulses produced by the sensor 62. The interval between the pulses represents the horizontal scan rate of the CRT. The rising edges of the individual pulses represent the instant at which the sensor 62 first senses the CRT beam and are indicated as $t_{si+n}$. The total number of pulses produced by the sensor per frame is a function of the size of the field of view of the sensor.

FIG. 6B indicates the timing of scan line addresses received by the light pen 58 (FIG. 4) from the computer 80 via the I/O connector 96 (FIG. 4). FIG. 6C shows the instant of the beginning of each horizontal scan line address, as received by the light pen 58. It is noted that this instant is somewhat offset from the horizontal sync instant due to asynchronous communication and processing delays which include delays due to computer multi-tasking. It may be appreciated from a consideration of FIG. 6C that the instants of the beginning of each horizontal scan line, as received by the light pen 58 are not entirely uniformly spaced in time, for these reasons.

FIG. 6D illustrates the raw X position determination for each detection by sensor 62. It is seen that the elapsed time between the start of each scan line instant and each sensor detection instant defines the X position and further that this elapsed time varies in an unpredictable manner from scan line to scan line due to the aforesaid asynchronous communication and processing delays. This variation is corrected for using averaging techniques in order to provide an enhanced accuracy output indication of horizontal position.

FIG. 6E shows the transmission of a horizontal position output signal by the pen in response to each group of detections by sensor 62, corresponding to a CRT field.

Figure 7:
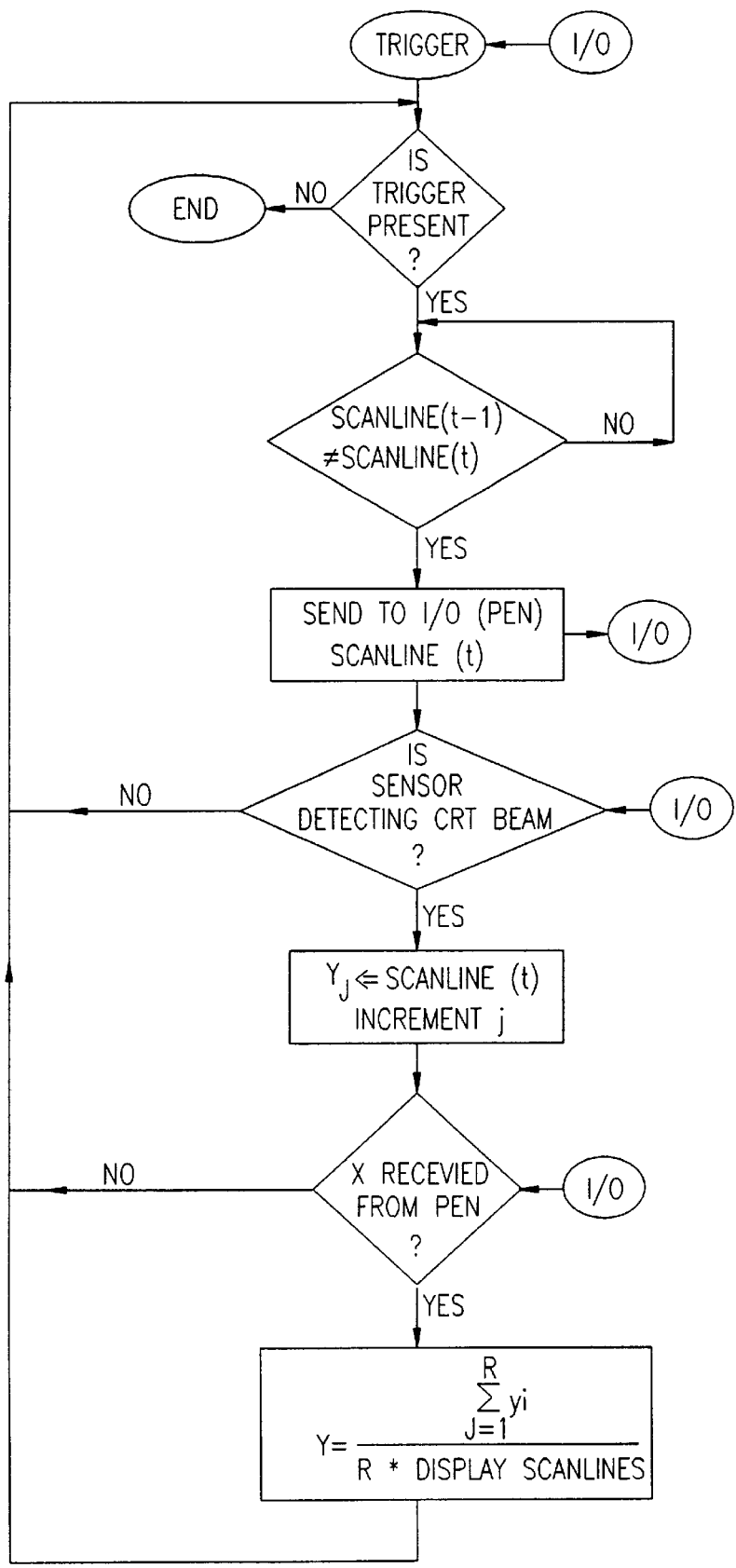
FIG. 7 is a flow chart illustrating operation of the interactive computer system of FIG. 5 in response to a trigger input whereby scan line addresses are output via an I/O port.

Reference is now made to FIG. 7, which is a flow chart illustrating typical operation of the interactive computer system of FIG. 5 in response to a trigger input whereby scan line addresses are output via an I/O port. Upon receipt of a trigger signal from the light pen 58 (FIG. 4) via I/O connector 96 (FIG. 4), an inquiry is made of the video card in the computer 80 whether the scanline address has changed. If yes, the new scanline address is transmitted to pen 58 by computer 80 via I/O connector 96. If sensor 62 is detecting a CRT beam at that instant, the scanline address is stored in a register in computer 80. When an horizontal position output is received by the computer 80 from the light pen, the vertical position is calculated by the indicated equation, where R is a running index of horizontal scan lines detected by sensor 62 and DISPLAY SCANLINES refer to all of the scan lines on the CRT and not just those detected by the light pen sensor 62.

Figure 8:
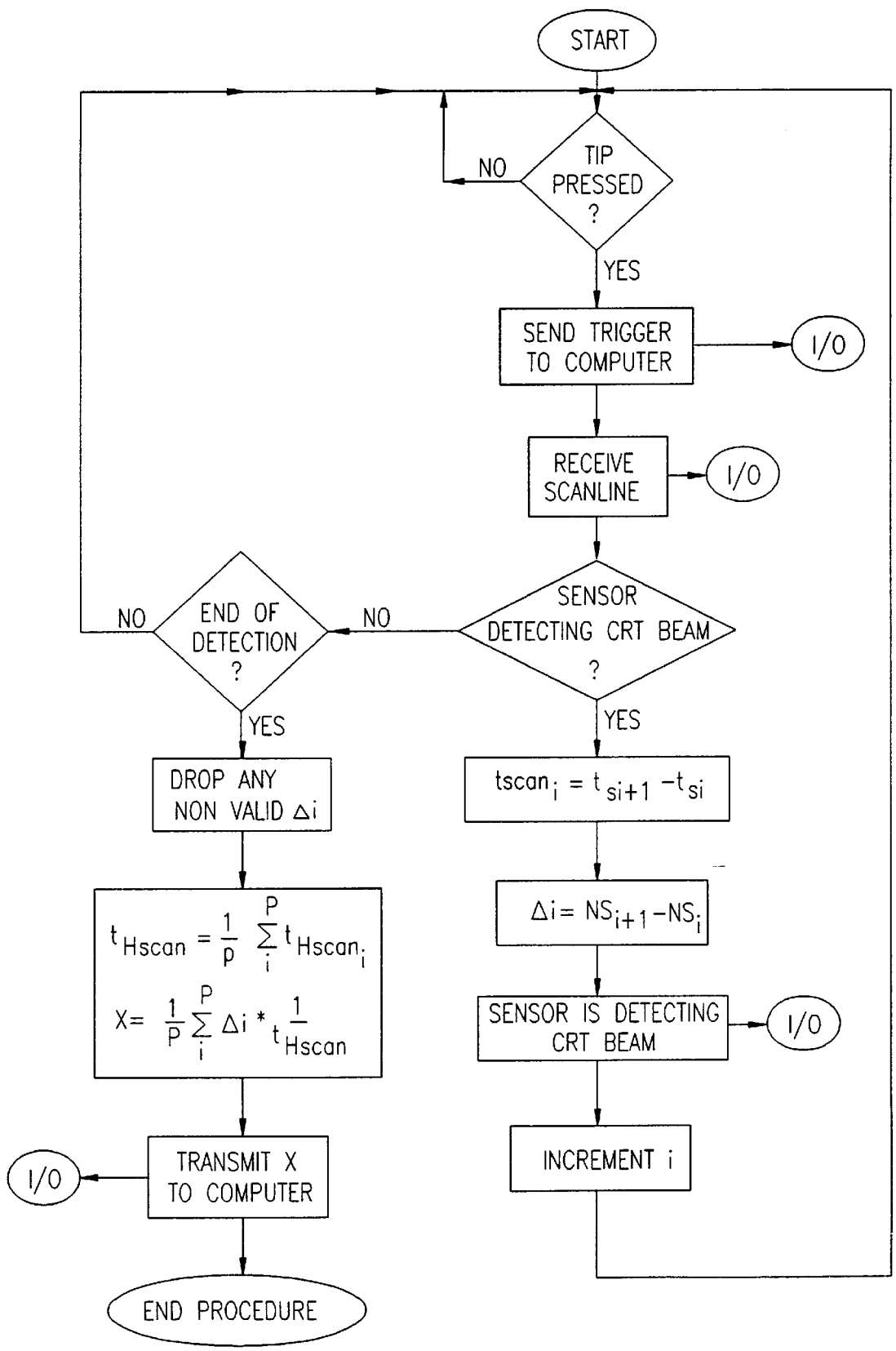
FIG. 8 is a flow chart illustrating operation of the interactive computer system of FIG. 5 in response to a trigger input whereby an estimated X position is derived from scan line addresses output via the I/O port and from light inputs to the light pen.

Reference is now made to FIG. 8, which is a flow chart illustrating operation of the interactive computer system of FIG. 5 in response to a trigger input whereby an estimated X position is derived from scan line addresses output via the I/O port and from light inputs to the light pen. When the tip of the light pen 58 (FIG. 4) is pressed onto the screen of a CRT display, thus operating trigger switch 68 (FIG. 4), the resulting trigger signal is supplied to computer 80 via I/O connector 96.

The computer 80 then receives the scanline address. In accordance with one preferred embodiment of the present invention, the scanline address may be derived from a DirectDraw scanline function provided in DirectX software, which is commercially available from Microsoft.

If sensor 62 detects a CRT beam, the time difference between sensor outputs, shown in FIG. 6A, is determined and the raw horizontal position, shown in FIG. 6D, is determined. An indication is provided by the light pen 58 to the computer 80 via I/O connector 96 that the sensor 62 is detecting a CRT beam. The computer then increments to the next scan line.

Once the sensor 62 no longer detects a CRT beam, the received raw horizontal position indications are evaluated and clearly erroneous indications are dropped. A summing and averaging functionality is then applied to provide an horizontal position output, shown in FIG. 6E. Here P indicates the number of not clearly erroneous raw horizontal position indicators. The horizontal position output is transmitted via I/O connector 96 to computer 80.

It will be appreciated by persons skilled in the art that the present invention is not limited by what has been particularly shown and described hereinabove. Rather the scope of the present invention includes combinations and subcombinations of the various features described as well as modifications thereof which would occur to a person of skill in the art upon reading the foregoing description and which are not in the prior art.

What is claimed is:

1. A light pen system for use with a CRT scanning display and a computer, the light pen system comprising:

a hand-held light receiving assembly which is adapted to be pointed at a desired location on a CRT scanning display and to provide a light detection output indication indicating precisely an instant when light detection occurs; and a horizontal line position signal synthesizer receiving at least one scan line address from the computer and being operative to generate horizontal line position information, based on the at least one scan line address, corresponding to the instant when light detection occurs.

2. A light pen system according to claim 1 and wherein the horizontal line position signal synthesizer receives multiple scan line addresses asynchronously from the computer and provides an estimated horizontal line position signal output based thereon.

3. A light pen system according to claim 2 and wherein the estimated horizontal line position output is provided by averaging a plurality of horizontal line position output indications derived from a plurality of the multiple scan line addresses.

4. A light pen system according to claim 1 and wherein the horizontal line position signal synthesizer receives the at least one scan line address from the computer in the absence of horizontal and vertical sync signals and is operative to generate horizontal line position information, based on the at least one scan line address, corresponding to the instant when light detection occurs, without employing horizontal and vertical sync signals.

5. A light pen system according to claim 1 and also comprising:

a vertical line position signal synthesizer receiving at least one scan line address from the computer and being operative to generate vertical line position information, based on the at least one scan line address, corresponding to the instant when light detection occurs.

6. A light pen system according to claim 1 and wherein the horizontal line position signal synthesizer is located within a hand-held housing that also encloses the hand-held light receiving assembly.

7. A light pen system for use with a CRT scanning display, the light pen system comprising:

a hand-held light receiving assembly which is adapted to be pointed at a desired location on a CRT scanning display and to provide a light detection output indication indicating precisely an instant when light detection occurs; and a horizontal line position signal synthesizer receiving at least one scan line address and being operative to generate horizontal line position information, based on the at least one scan line address, corresponding to the instant when light detection occurs.

8. A light pen system according to claim 7 and wherein the horizontal line position signal synthesizer receives multiple scan line addresses asynchronously and provides an estimated horizontal line position signal output based thereon.

9. A light pen system according to claim 8 and wherein the estimated horizontal line position output is provided by averaging a plurality of horizontal line position output indications derived from a plurality of the multiple scan line addresses.

10. A light pen system according to claim 7 and wherein the horizontal line position signal synthesizer receives the at least one scan line address in the absence of horizontal and vertical sync signals and is operative to generate horizontal line position information, based on the at least one scan line address, corresponding to the instant when light detection occurs, without employing horizontal and vertical sync signals.

11. A light pen system according to claim 7 and wherein the horizontal line position signal synthesizer employs hardware forming part of a computer.

12. A light pen system according to claim 7 and also comprising:

a vertical line position signal synthesizer receiving at least one scan line address and being operative to generate vertical line position information, based on the at least one scan line address, corresponding to the instant when light detection occurs.

13. A computer light pen system comprising:

a computer;

a CRT scanning display;

a hand-held light receiving assembly which is adapted to be pointed at a desired location on a CRT scanning display and to provide a light detection output indication indicating when light detection occurs; and a horizontal line position signal synthesizer receiving at least one scan line address and being operative to generate horizontal line position information, based on the at least one scan line address, corresponding to when light detection occurs.

14. A computer light pen system comprising:

a computer;

a CRT scanning display;

a hand-held light receiving assembly which is adapted to be pointed at a desired location on a CRT scanning display and to provide a light detection output indication indicating when light detection occurs; and wherein the computer comprises:

a horizontal line position signal synthesizer receiving at least one scan line address and being operative to generate horizontal line position information, based on the at least one scan line address, corresponding to when light detection occurs.

15. A light pen system for use with a CRT scanning display and a computer, the light pen system comprising:

a hand-held light receiving assembly which is adapted to be pointed at a desired location on a CRT scanning display and to provide a light detection output indication indicating precisely an instant when light detection occurs; and a vertical line position signal synthesizer receiving at least one scan line address from the computer and being operative to generate vertical line position information, based on the at least one scan line address, corresponding to the instant when light detection occurs.

16. A light pen system according to claim 15 and wherein the horizontal line position signal synthesizer is located within a hand-held housing that also encloses the hand-held light receiving assembly.

17. A light pen system for use with a CRT scanning display, the light pen system comprising:

a hand-held light receiving assembly which is adapted to be pointed at a desired location on a CRT scanning display and to provide a light detection output indication indicating precisely an instant when light detection occurs; and a vertical line position signal synthesizer receiving at least one scan line address and being operative to generate vertical line position information, based on the at least one scan line address, corresponding to the instant when light detection occurs.

18. A light pen method for use with a CRT scanning display and a computer, the light pen method comprising:

pointing a hand-held light receiving assembly at a desired location on a CRT scanning display and providing a light detection output indication indicating precisely an instant when light detection occurs; and operating a horizontal line position signal synthesizer receiving at least one scan line address from the computer to generate horizontal line position information, based on the at least one scan line address, corresponding to the instant when light detection occurs.

19. A light pen method according to claim 18 and wherein the horizontal line position signal synthesizer receives multiple scan line addresses asynchronously from the computer and provides an estimated horizontal line position signal output based thereon.

20. A light pen method according to claim 19 and wherein the estimated horizontal line position output is provided by averaging a plurality of horizontal line position output indications derived from a plurality of the multiple scan line addresses.

21. A light pen method according to claim 18 and wherein the horizontal line position signal synthesizer receives the at least one scan line address from the computer in the absence of horizontal and vertical sync signals and is operative to generate horizontal line position information, based on the at least one scan line address, corresponding to the instant when light detection occurs, without employing horizontal and vertical sync signals.

22. A light pen method according to claim 18 and also comprising:

operating a vertical line position signal synthesizer receiving at least one scan line address from the computer to generate vertical line position information, based on the at least one scan line address, corresponding to the instant when light detection occurs.

23. A light pen method for use with a CRT scanning display, the light pen method comprising:

pointing a hand-held light receiving assembly at a desired location on a CRT scanning display and providing a light detection output indication indicating precisely an instant when light detection occurs; and employing a horizontal line position signal synthesizer receiving at least one scan line address to generate horizontal line position information, based on the at least one scan line address, corresponding to the instant when light detection occurs.

24. A light pen method according to claim 23 and wherein the horizontal line position signal synthesizer receives multiple scan line addresses asynchronously and provides an estimated horizontal line position signal output based thereon.

25. A light pen method according to claim 23 and wherein the horizontal line position signal synthesizer receives the at least one scan line address in the absence of horizontal and vertical sync signals and is operative to generate horizontal line position information, based on the at least one scan line address, corresponding to the instant when light detection occurs, without employing horizontal and vertical sync signals.

26. A light pen method according to claim 23 and wherein the horizontal line position signal synthesizer employs hardware forming part of a computer.

27. A light pen method according to claim 23 and wherein the estimated horizontal line position output is provided by averaging a plurality of horizontal line position output indications derived from a plurality of the multiple scan line addresses.

28. A light pen method according to claim 23 and also comprising:

employing a vertical line position signal synthesizer receiving at least one scan line address to generate vertical line position information, based on the at least one scan line address, corresponding to the instant when light detection occurs.

* * * * *